United States Patent
Helsley et al.

(10) Patent No.: US 7,185,926 B2
(45) Date of Patent: Mar. 6, 2007

(54) PRELOADED LATCH MECHANISM

(75) Inventors: Thomas J. Helsley, Long Beach, CA (US); Timothy S. Rozema, Ladera Ranch, CA (US)

(73) Assignee: Hartwell Corporation, Placentia, CA (US)

( * ) Notice: Subject to any disclaimer, the term of this patent is extended or adjusted under 35 U.S.C. 154(b) by 36 days.

(21) Appl. No.: 11/089,971

(22) Filed: Mar. 25, 2005

(65) Prior Publication Data

US 2006/0214431 A1    Sep. 28, 2006

(51) Int. Cl.
*E05C 5/00* (2006.01)
*E05C 19/14* (2006.01)

(52) U.S. Cl. .................. 292/113; 292/247; 292/256.69; 292/DIG. 49

(58) Field of Classification Search ............... 292/113, 292/247, 256.69, 256.65, DIG. 31, DIG. 49, 292/249–250, 96–97, 108, 210, 194, 240
See application file for complete search history.

(56) References Cited

U.S. PATENT DOCUMENTS

| | | | |
|---|---|---|---|
| 2,896,751 A | 7/1959 | Henrichs | |
| 2,927,812 A * | 3/1960 | Smith et al. ................ | 292/196 |
| 4,099,751 A | 7/1978 | Poe et al. | |
| 4,116,479 A | 9/1978 | Poe | |
| 4,130,260 A | 12/1978 | Poe | |
| 4,130,307 A | 12/1978 | Poe et al. | |
| 4,183,564 A | 1/1980 | Poe | |
| 4,220,364 A | 9/1980 | Poe | |
| 4,307,905 A | 12/1981 | Poe et al. | |
| 4,318,557 A | 3/1982 | Bourne et al. | |
| 4,365,831 A | 12/1982 | Bourne | |
| RE31,935 E | 7/1985 | Poe | |
| 4,530,529 A | 7/1985 | Poe et al. | |
| 4,548,435 A * | 10/1985 | Bourne ...................... | 292/229 |
| 4,602,812 A * | 7/1986 | Bourne ...................... | 292/113 |
| 4,693,503 A * | 9/1987 | Bisbing ..................... | 292/210 |
| 4,743,052 A * | 5/1988 | Stammreich et al. ....... | 292/113 |
| 4,752,091 A | 6/1988 | Jackson | |
| 4,759,574 A | 7/1988 | James | |
| 4,826,221 A | 5/1989 | Harmon | |
| 4,828,299 A | 5/1989 | Poe | |
| 4,911,485 A | 3/1990 | Wasilewski | |
| 4,979,766 A | 12/1990 | Wasilewski | |
| 4,991,885 A | 2/1991 | Poe | |
| 5,016,931 A | 5/1991 | Jackson | |
| 5,152,559 A | 10/1992 | Henrichs | |
| 5,620,212 A | 4/1997 | Bourne et al. | |
| 5,664,813 A * | 9/1997 | Gromotka .................. | 292/229 |

(Continued)

*Primary Examiner*—Brian E. Glessner
*Assistant Examiner*—Alyson M. Merlino
(74) *Attorney, Agent, or Firm*—Barnes & Thornburg LLP (57) ABSTRACT

A latch mechanism for releasably latching a first member to a second member. The latch mechanism includes a bracket adapted to be attached to the first member and bolt pivotally coupled to the bracket. A handle is pivotally coupled to the bracket and is operatively associated with the bolt such that the handle selectively pivots the bolt between a latched and unlatched position. A trigger is pivotally coupled to the handle and a locking member is pivotally coupled to the trigger. The locking member is adapted to releasably couple the trigger to the bracket to prevent pivotal movement of the handle and the bolt from the latched position. The trigger includes the tool receiving recess such that the latch mechanism may be moved between the latched and unlatched positions with the mechanical advantage provided by the tool.

21 Claims, 5 Drawing Sheets

U.S. PATENT DOCUMENTS

| | | |
|---|---|---|
| 5,765,883 A | 6/1998 | Dessenberger |
| 5,984,382 A | 11/1999 | Bourne et al. |
| 6,279,971 B1 | 8/2001 | Dessenberger, Jr. |
| 6,325,428 B1 | 12/2001 | Do |
| 6,343,815 B1 * | 2/2002 | Poe ............................ 292/113 |
| 6,606,889 B1 * | 8/2003 | Tweedy ....................... 70/208 |

* cited by examiner

PRELOADED LATCH MECHANISM

BACKGROUND

The present disclosure relates to a latch mechanism for releasably latching and/or holding a first member with respect to a second member with a high preload force, and in particular to a latch mechanism including a trigger having a pivotal locking member and a tool coupler.

Channel latches are used to latch a member such as a panel or door to an adjacent member such as an aircraft frame. Existing latches have secured adjacent members together with a preload force in the range of 25 to 30 pounds. While this level of preload force is sufficient for many applications, latches that are subject to high levels of vibration exhibit excessive rates of wear at these preload levels. Aircraft latches have required replacement every six to twelve months due to the excessive wear which results from the combination of high amplitude of vibration applied the latches and the low level of preload force applied by the latches. A latch that provides a high level of preload force will have a longer service life when subjected to high amplitude vibration than will a latch that provides a low level of preload force. However, the amount of preload force that is provided by a latch has been limited due to the limited force a user can directly apply to the latch by hand in order to operate the latch, especially if the latch must be operated with the user being in an awkward position.

SUMMARY

A latch mechanism for releasably latching a first member to a second member. The latch mechanism comprises a bracket adapted to be attached to the first member. A bolt is pivotally coupled to the bracket for pivotal movement with respect to the bracket between a first position, wherein the bolt is adapted to engage the second member, and a second position wherein the bolt is adapted to be disengaged from the second member. A handle is pivotally coupled to the bracket and is operatively associated with the bolt. The handle is pivotal with respect to the bracket between a third position and fourth position. The handle operatively pivots the bolt from the first position to the second position as the handle pivots from the third position to the fourth position. Conversely, the handle operatively pivots the bolt from the second position to the first position as the handle pivots from the fourth position to the third position. A trigger is pivotally coupled to the handle and is pivotal with respect to the handle between a fifth position and a sixth position. A locking member comprising a hook is pivotally coupled to the trigger. The locking member is adapted to releasably couple the trigger to the bracket when the trigger is in the fifth position whereby the locking member prevents pivotal movement of the handle from the third position toward the fourth position. The trigger is selectively pivotal from the fifth position to the sixth position to uncouple the locking member from the bracket such that the handle is selectively pivotal from the third position to the fourth position. The trigger includes a tool coupler, such as a recess, adapted to couple a tool to the trigger such that the tool provides mechanical advantage in the operation of the latch mechanism and whereby the latch mechanism is adapted to provide a high preload force in the latched position.

An over-center linkage assembly couples the handle to the bracket and to the bolt. The linkage assembly includes a first link, a second link and a third link. The first link includes a first end pivotally coupled to the bolt and a second end. The second link includes a first end pivotally coupled to the second end of the first link and a second end pivotally coupled to the bracket. The third link includes a first end pivotally coupled to the second end of the first link and the first end of the second link and a second end pivotally coupled to the handle. The linkage assembly is moveable between an over-center latched position, wherein the first link and second link are adapted to bias the bolt into engagement with the second member with a preload force, and an unlatched position wherein the bolt is disengaged from the second member. The linkage assembly is moveable to the unlatched position by movement of the handle from the third position toward the fourth position.

DETAILED DESCRIPTION

Figure 1:
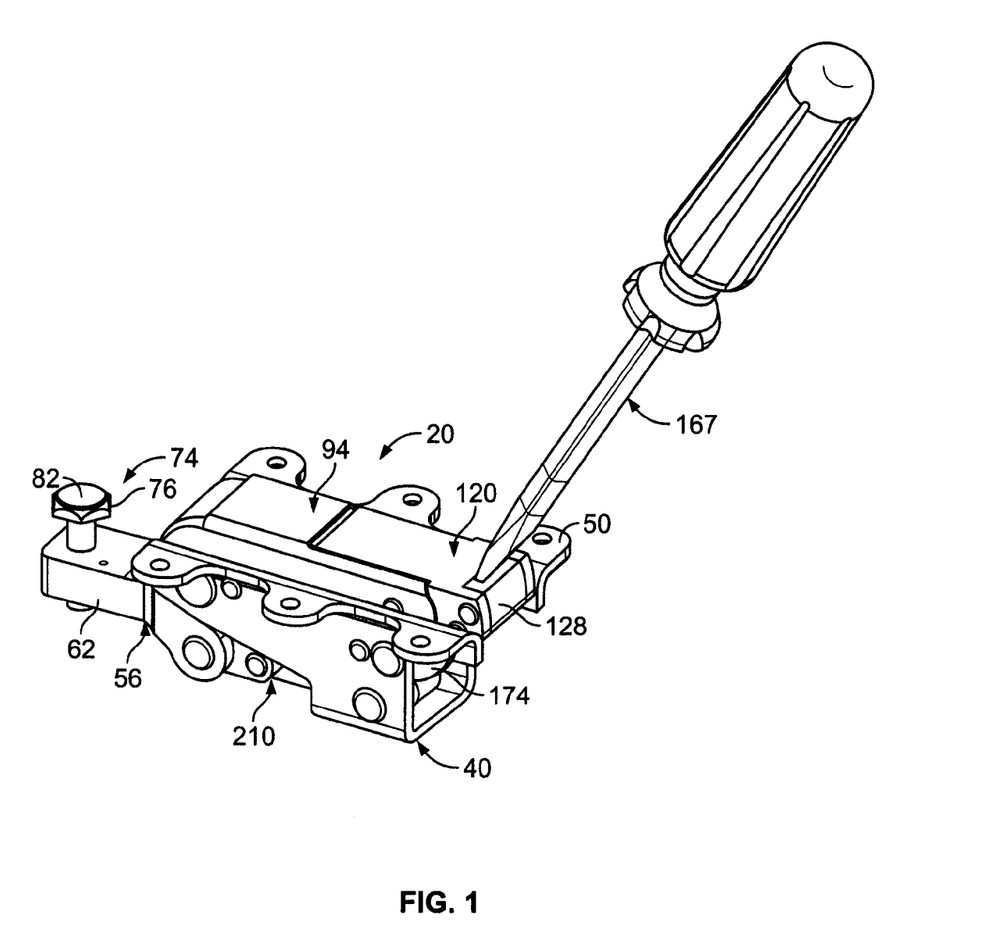
FIG. 1 is a perspective view of the latch mechanism shown with a tool coupled to the trigger by the tool coupler.
Figure 2:
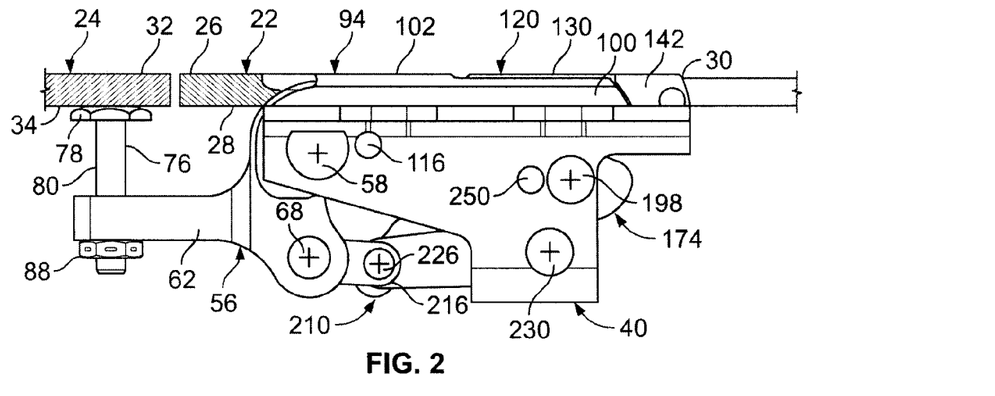
FIG. 2 is a side elevational view of the latch mechanism shown latching a first member to a second member.
Figure 3:
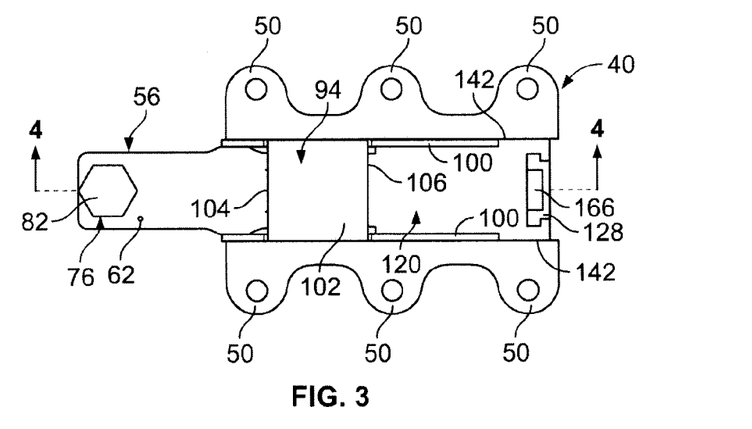
FIG. 3 is a top plan view of the latch mechanism in the latched position.

As shown in FIG. 2, the latch mechanism 20 is adapted to releasably latch a first member 22 to a second member 24. The first member 22 includes a first surface 26, a second surface 28, and an aperture 30 that extends through the first member 22 from the first surface 26 to the second surface 28. The second member 24 includes a first surface 32 and a second surface 34. The second member 24 may be, as an example, an aircraft frame or other body member. The first member 22 may be, as an example, a door or panel that is adapted to be removed or displaced with respect to the second member 24.

Figure 9:
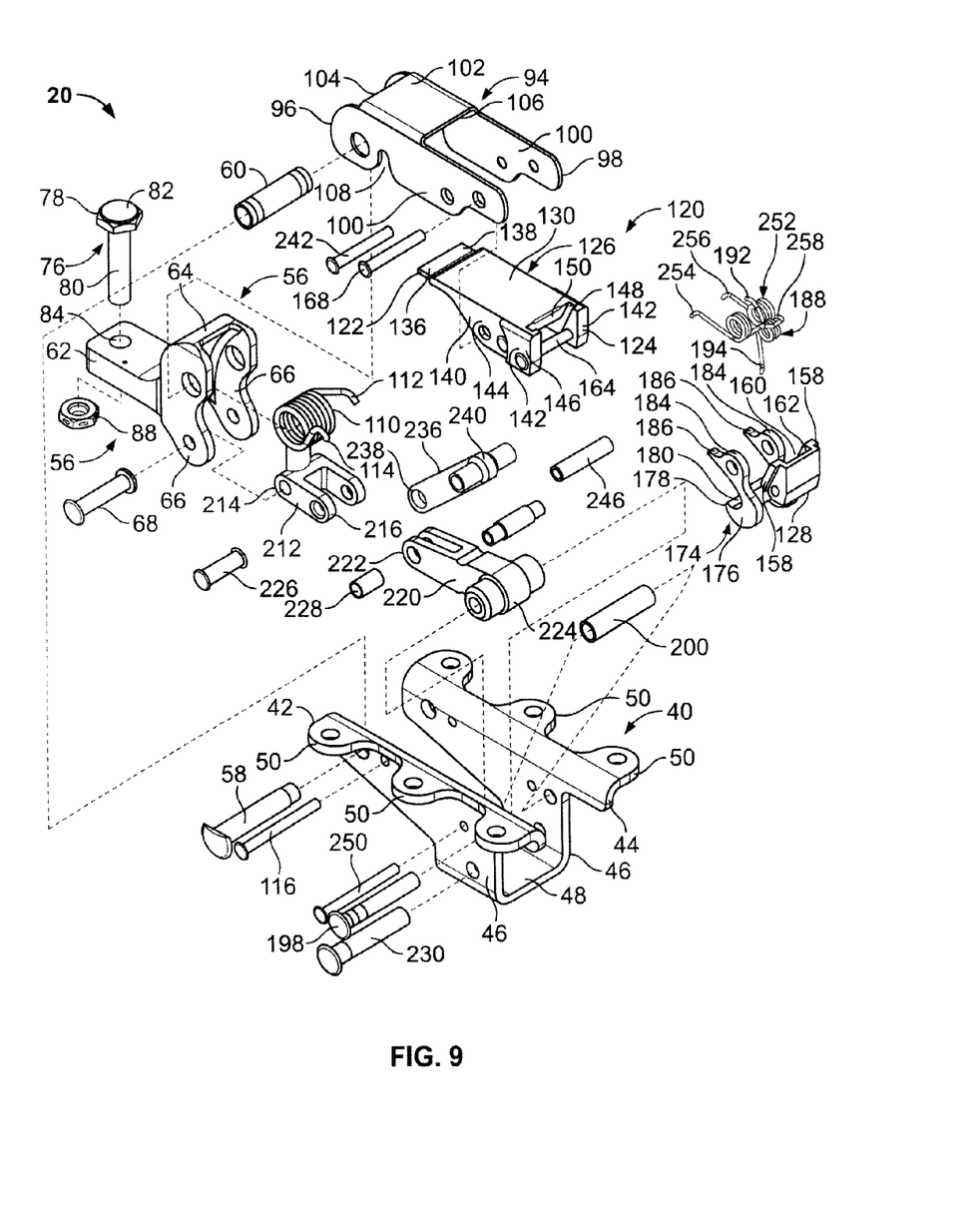
FIG. 9 is an exploded view of the latch mechanism.

The latch mechanism 20 shown in FIG. 9 includes a bracket 40 that extends between a first end 42 and a second end 44. The bracket 40 includes a pair of generally planar side walls 46 that are spaced apart and generally parallel to one another. A generally planar bottom wall 48 extends between the bottom ends of the side walls 46 and is generally perpendicular to the side walls 46, such that the side walls 46 and bottom wall 48 are generally U-shaped. A plurality of flanges 50 extend outwardly and generally perpendicularly from the top end of each side wall 46. Each flange 50 includes an aperture adapted to receive a fastener for use in attaching the bracket 40 in engagement with the second surface 28 of the first member 22 in alignment with the aperture 30.

Figure 4:
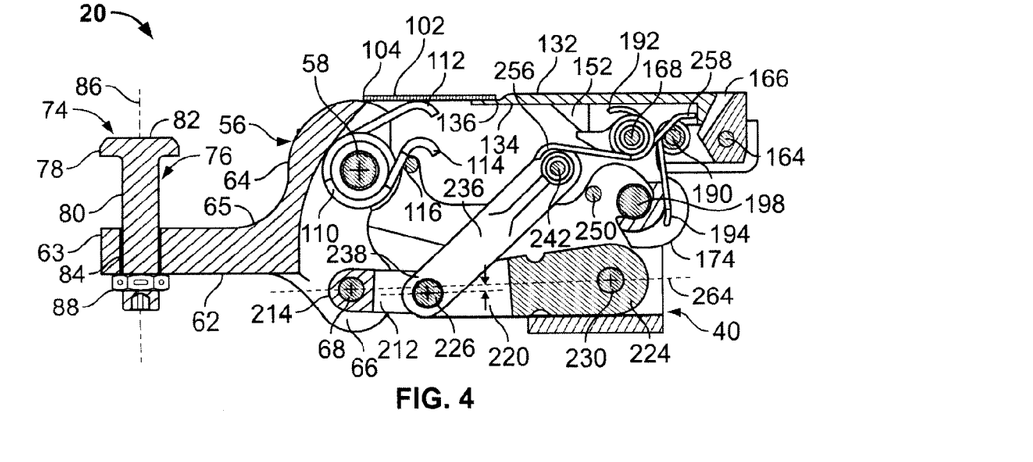
FIG. 4 is a cross sectional view taken along line 4—4 of FIG. 3.
Figure 5:
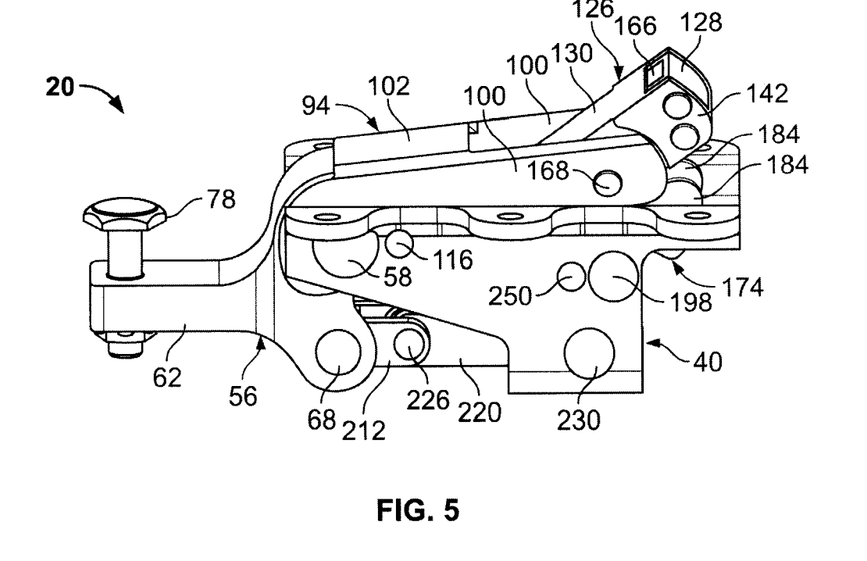
FIG. 5 is a perspective view of the latch mechanism in an intermediate position between the latched position and the unlatched position.
Figure 6:
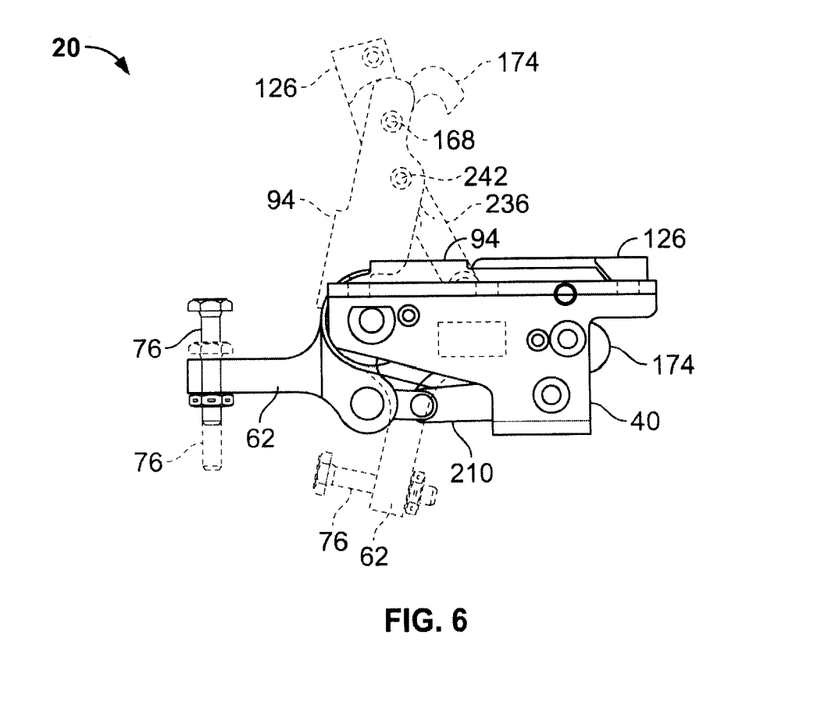
FIG. 6 is a side elevational view of the latch mechanism shown in the latched position in solid lines and in the unlatched position in phantom lines.
Figure 7:
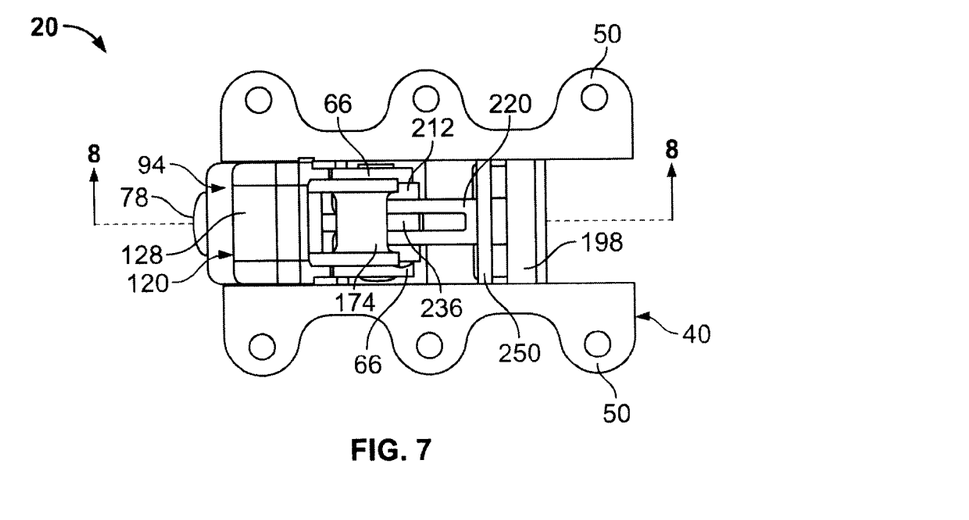
FIG. 7 is a top plan view of the latch mechanism shown in the unlatched position.
Figure 8:
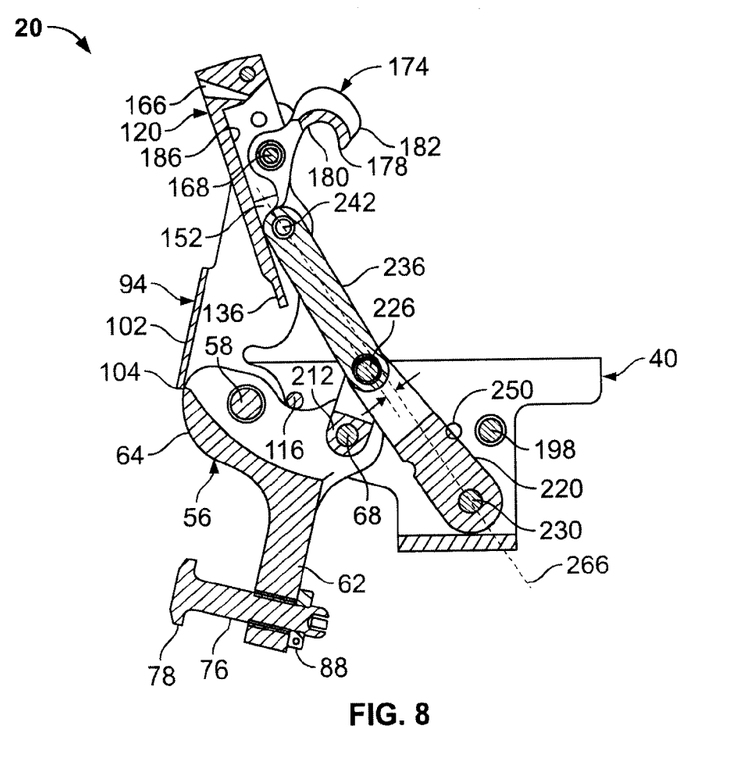
FIG. 8 is a cross sectional view taken along line 8—8 of FIG. 7.

The latch mechanism 20 shown in FIG. 4 includes a bolt 56 that is pivotally coupled to the bracket 40 by a pin 58. The pin 58 extends generally transversely between the side walls 46 of the bracket 40 and is coupled at each end to a respective side wall 46. A generally cylindrical bushing 60 extends around the pin 58. The bolt 56 is adapted to pivot about the central longitudinal axis of the pin 58 with respect to the bracket 40 between a latched position as shown in FIG. 4 and an unlatched position as shown in FIG. 8. The bolt 56 includes an arm 62 having a first end 63 and a second end 65. The second end 65 of the arm 62 is attached to a shoulder 64 that extends upwardly from the arm 62. A pair of spaced apart and generally parallel lugs 66 extend outwardly from the shoulder 64 and the second end 65 of the arm 62. The pin 58 and bushing 60 extend through respective apertures in the top portion of each lug 66. A pin 68 extends generally transversely between the lower portions of the lugs 66 and is coupled at each end to a respective lug 66.

An adjustment mechanism 74 shown in FIG. 4 is located at the first end 63 of the arm 62. The adjustment mechanism 74 includes an engagement member 76 having a head 78 and a threaded shaft 80. The head 78 includes a generally planar engagement surface 82. The shaft 80 extends through a threaded bore 84 in the first end 63 of the arm 62. The engagement member 76 is threadably attached to the arm 62 and is selectively positionable with respect to the arm 62 along the central axis 86 of the shaft 80 by appropriate rotation of the engagement member 76 about the axis 86 with respect to the arm 62. The location of the engagement surface 82 with respect to the arm 62 may be selectively positioned as desired. The adjustment mechanism 74 also includes a threaded lock nut 88 that is threadably attached to the shaft 80 and that is adapted to engage the arm 62 to thereby lock the engagement member 76 in place with respect to the arm 62 and prevent undesired rotation of the engagement member 76 with respect to the arm 62.

The latch mechanism 20 also includes an elongated handle 94 that extends between a first end 96 and a second end 98. The handle 94 includes a pair of generally planar side walls 100 that are spaced apart and generally parallel to one another. A generally planar top wall 102 extends between the top ends of the side walls 100 generally perpendicular to the side walls 100, such that the side walls 100 and top wall 102 are arranged in a generally inverted U-shaped manner. The top wall 102 extends between a first end 104 and a second end 106 and includes a generally planar top surface and a generally planar bottom surface. The first end 104 is located inwardly from the first end 96 of the handle 94 and the second end 106 of the top wall 102 is located substantially inwardly from the second end 98 of the handle 94. Each side wall 100 of the handle 94 includes an open ended slot 108 that extends upwardly from the bottom end of the side wall 100 toward the top wall 102. The pin 58 and bushing 60 extend through respective apertures in the side walls 100 of the handle 94 such that the handle 94 is pivotally coupled to the bracket 40 for selective pivotal movement about the central axis of the pin 58 between a latched position as shown in FIG. 4 and an unlatched position as shown in FIG. 8. The side walls 100 of the handle 94 are located inwardly between and adjacent the side walls 46 of the bracket 40. The lugs 66 of the bolt 56 are located inwardly between and adjacent the side walls 100 of the handle 94. The first end 104 of the top wall 102 is adapted to engage the top end of the shoulder 64 and lugs 66 of the bolt 56 when the latch mechanism 20 is in the closed or latched position as shown in FIG. 4 and when the latch mechanism 20 is in the open or unlatched position as shown in FIG. 8.

A resilient biasing member 110, such as a coil torsion spring, is coupled to the pin 58 and bushing 60 and includes a first end 112 in biased engagement with the bottom surface of the top wall 102 of the handle 94 and a second end 114 in biased engagement with a pin 116 of the bracket 40 that extends between the side walls 46 of the bracket 40. The biasing member 110 resiliently biases the handle 94 to pivot about the central axis of the pin 58 in a generally counter-clockwise direction as viewed in FIG. 4 from the latched position toward the unlatched position. The biasing member 110 also resiliently biases the bolt 56 to pivot in a generally counter-clockwise direction about the central axis of the pin 58 from the latched position as shown in FIG. 4 toward the unlatched position as shown in FIG. 8, due to the engagement of the top wall 102 of the handle 94 with the bolt 56. As shown in FIG. 4, when the handle 94 is in the latched position, the pin 116 is located within the slots 108 of the side walls 100 of the handle 94.

The latch mechanism 20 also includes a trigger 120 that extends between a first end 122 and a second end 124. The trigger 120 includes a body 126 that extends from the first end 122 to the second end 124 and a cap 128 that is attached to the body 126 at the second end 124. The body 126 of the trigger 120 includes a top wall 130 having a generally planar top surface 132 and a generally planar bottom surface 134. As shown in FIG. 4, the top surface 132 is adapted to be generally coplanar with the top surface of the top wall 102 of the handle 94 when the handle 94 and trigger 120 are in their latched positions. A tab 136 is located at the first end 122 of the body 126 and projects outwardly from the top wall 130. The tab 136 includes a top surface 138. The top surface 138 of the tab 136 is generally parallel to the top surface 132 of the top wall 130 and is in a plane located between the top surface 132 and bottom surface 134 of the top wall 130. The top surface 138 of the tab 136 is adapted to engage the bottom surface of the top wall 102 of the handle 94 as shown in FIG. 4 to prevent pivotal movement of the trigger 120 in a clockwise direction with respect to the handle 94 beyond the position as shown in FIG. 4.

The body 126 also includes a pair of spaced apart side walls 140. Each side wall 140 extends downwardly from a respective side edge of the top wall 130 such that the side walls 140 and top wall 130 are arranged in a generally inverted U-shaped manner. Each side wall 140 includes an ear 142 located at the second end 124 of the trigger 120. Each side wall 140 also includes a generally planar vertical first outer surface portion 144 that extends from the first end 122 of the trigger 120 to the ear 142, and a second outer surface portion 146 at each ear 142 that is generally parallel to the first surface portion 144 and that is spaced outwardly from the central longitudinal axis of the trigger 120 with respect to the first surface portion 144. The second surface portions 146 of the ears 142 are adapted to be located between and closely adjacent to the side walls 46 of the bracket 40. Pockets are formed between the first surface portions 144 of the side walls 140 and the side walls 46 of the bracket 40 that respectively receive the side walls 100 of the handle 94. Each ear 142 includes a groove 148 that extends downwardly from the top wall 130. The grooves 148 of the ears 142 are generally parallel to one another and are inclined at an acute angle relative to the top surface 132 of the top wall 130. An end wall 150 extends downwardly from the top wall 130 at the second end 124 of the body 126 and extends laterally between the ears 142. The body 126 also includes a stop member 152 that extends downwardly from the bottom surface 134 of the top wall 130.

The cap 128 of the trigger 120 includes a pair of spaced apart and generally parallel flanges 158 and a channel 160 located between the flanges 158. Each flange 158 is adapted to be inserted into and received within a respective groove 148 of the body 126 such that the cap 128 is thereby coupled to the body 126. A retainer member 164, such as a pin, extends through the ears 142 and the cap 128 to retain the cap 128 in engagement with the body 126. The cap 128 includes a generally planar wall 162 formed by the channel 160.

The trigger 120 includes a tool coupler that is adapted to removably couple a tool to the trigger 120. The tool coupler may be, for example, a recess 166 formed by the channel 160 between the end wall 150 of the body 126 and the wall 162 of the cap 128. The end wall 150 and wall 162 are inclined with respect to one another such that the recess 166 is generally wedged-shaped with the recess 166 tapering inwardly as the recess 166 extends downwardly from the top surface 132 of the top wall 130. The recess 166 is adapted to removably receive the tip of a tool 167, such as the tip of the blade of a screwdriver or a pry bar. The trigger 120 is pivotally coupled to the handle 94 by a pin 168 that extends through the side walls 100 of the handle 94 and through the side walls 140 of the trigger 120. The trigger 120 is pivotal with respect to the handle 94 about the central longitudinal axis of the pin 168 between a latched position as shown in FIG. 4 and an unlatched position as shown in FIG. 8. The trigger 120 is prevented from pivoting in a clockwise direction with respect to the handle 94 beyond the latched position as shown in FIG. 4, in a direction away from the unlatched position, by engagement of the tab 136 with the top wall 102 of the handle 94.

The latch mechanism 20 also includes a locking member 174. The locking member 174 includes a hook 176 having a tip 178, a concavely curved receptacle 180, and an outer peripheral surface 182. The locking member 174 also includes a pair of spaced apart and generally parallel arms 184 that are attached to and that extend outwardly from the hook 176. The outer end of each arm 184 includes an outwardly extending finger 186. The locking member 174 is pivotally coupled to the trigger 120 by a pin 168 that extends through a respective aperture in each arm 184 of the locking member 174 and that is coupled at each end to a respective side wall 140 of the trigger 120. A resilient biasing member 188, such as a coil torsion spring, is coupled to a pin 190 of the trigger 120 which extends between the side walls 140. The biasing member 188 includes a first end 192 that is in biased engagement with the pin 168 and a second end 194 that is in biased engagement with the hook 176 of the locking member 174. The biasing member 188 may be wrapped around the pin 190. The biasing member 188 resiliently biases the locking member 174 in a generally clockwise direction as viewed in FIG. 4 about the central axis of the pin 168. When the locking member 174 is in the latched position as shown in FIG. 4, the biasing member 188 resiliently biases the hook 176 into engagement with a locking pin 198 having a bushing 200 that extends generally transversely between the side walls 46 of the bracket 40. When the locking member 174 is in the unlatched position as shown in FIG. 8, the biasing member 188 resiliently biases the fingers 186 of the locking member 174 into engagement with the stop member 152 of the trigger 120 such that the fingers 186 and stop member 152 prevent further pivotal movement of the locking member 174 beyond the latched position. The biasing member 188 allows the locking member 174 to pivot in a counter-clockwise direction about the central axis of the pin 168 from the latched position as shown in FIG. 4 to an unlatched position wherein the locking pin 198 is located outside the receptacle 180 of the hook 176 such that the locking member 174 is uncoupled from the pin 198 and the bracket 40.

The latch mechanism 20 includes an over-center linkage assembly 210 that operatively couples the handle 94 to the bracket 40 and bolt 56. The linkage assembly 210 includes a bolt link 212 having a first end 214 and a second end 216. The first end 214 of the bolt link 212 is pivotally coupled to the lugs 66 of the bolt 56 by the pin 68 which extends through a bore in the first end 214 of the bolt link 212. The bolt link 212 is pivotal with respect to the bolt 56 about the central axis of the pin 68.

The linkage assembly 210 includes a bracket link 220 having a first end 222 and a second end 224. The first end 222 of the bracket link 220 is pivotally coupled to the second end 216 of the bolt link 212 by a pin 226 and bushing 228 that extend through the first end 222 of the bracket link 220 and the second end 216 of the bolt link 212. The second end 224 of the bracket link 220 is pivotally coupled to the side walls 46 of the bracket 40 by a pin 230. The bracket link 220 is pivotal with respect to the bracket 40 about the central axis of the pin 230.

The linkage assembly 210 also includes a handle link 236 having a first end 238 and a second end 240. The first end 238 of the handle link 236 is pivotally coupled to the second end 216 of the bolt link 212 and to the first end 222 of the bracket link 220 by the pin 226 and bushing 228. The second end 240 of the handle link 236 is pivotally coupled to the handle 94 by a pin 242 that extends through the second end 240 of the handle link 236 and that extends generally perpendicularly between the side walls 100 of the handle 94. The handle link 236 is adapted to pivot with respect to the handle 94 about the central axis of the pin 242. A link stop pin 250 is coupled to an extends transversely between the side walls 46 of the bracket 40. The stop pin 250 is adapted to engage the bracket link 220 when the latch mechanism 20 is in the unlatched position as shown in FIG. 8.

The latch mechanism 20 includes a resilient biasing member 252, such as a coil torsion spring, coupled to the pin 168. The biasing member 252 has a first end 254 and a second end 256 that are in biased engagement with the second end 240 of the handle link 246 and pin 242. The biasing member 252 includes a third end 258 that is in biased engagement with the pin 190. The biasing member 252 resiliently biases the trigger 120 in a generally clockwise direction about the central axis of the pin 168 with respect to the handle 94 from the unlatched position as shown in FIG. 8 toward the latched position as shown in FIG. 4.

When the latch mechanism 20 is in the latched position as shown in FIG. 4, the central axis of the pin 226 is located outwardly beyond a center line 264 that extends through the central axes of the pins 68 and 230. The linkage assembly 210 is thereby in an over-center or toggled condition. The bolt link 212, bracket link 220 and handle link 236 are each in compression in the over-center latched position such that the linkage assembly 210 biases the bolt 56 to pivot clockwise about the pin 58 and thereby force the engagement surface 82 of the engagement member 76 into engagement with the second surface 34 of the second member 24 with a desired amount of preload force. The bracket link 220 engages the bottom wall 48 of the bracket 40 in the latched position such that the bracket link 220 is prevented from pivoting counter-clockwise about the pin 230 beyond the latched position as shown in FIG. 4. The over-center position of the linkage assembly 210 resleasably locks the bolt 56 in the latched position.

As also shown in FIG. 4, when the latch mechanism 20 is in the latched position, the hook 176 of the locking member 174 receives and engages the locking pin 198 such that the locking member 174 prevents pivotal movement of the handle 94 about the pin 58 from the latched position toward the unlatched position. The locking member 174 thereby also acts as a lock to releasably retain the bolt 56 in the latched position. Also as shown in FIG. 4, when the latch mechanism 20 is in the latched position, the handle 94 and trigger 120 are located in the aperture 30 of the first member 22 with the top surface of the handle 94 and trigger 120 being generally parallel to and coplanar with the first surface 26 of the first member 22.

The magnitude of preload force with which the engagement member 76 engages the second member 24 can be selectively adjusted by adjusting the position of the engagement surface 82 with respect to the arm 62 of the bolt 56. Extending the engagement surface 82 further from the arm 62 will result in a larger preload engagement force being generated, while retracting the engagement surface 82 closer to the arm 62 will result in a lower preload engagement force being generated.

When it is desired to unlatch the latch mechanism 20 from the latched position, the tip of the tool 167, such as a screwdriver, is inserted into the recess 166 of the trigger 120. With the mechanical advantage provided by the tool 167, the trigger 120 is pivoted counter-clockwise with respect to the handle 94 about the central axis of the pin 168 toward the unlatched position. As the trigger 120 pivots from the latched position toward the unlatched position, the engagement of the arms 184 of the locking member 174 with the stop member 152 causes the locking member 174 to conjointly rotate with the trigger 120 about the axis of the pin 168 from the latched position as shown in FIG. 4 to an unlatched position wherein the hook 176 is uncoupled from the pin 198 and bracket 40, such that the handle 94 is selectively pivotal with respect to the bracket 40 from the latched position toward the unlatched position.

Further application of force to the trigger 120, utilizing the mechanical advantage provided by the tool 167 inserted into the recess 166, pivots the handle 94 with respect to the bracket 40 about the central axis of the pin 58 from the latched position as shown in FIG. 4 toward the unlatched position as shown in FIG. 8. As the handle 94 pivots from the latched position toward the unlatched position, the handle link 236 is placed in tension and pulls the pin 226 from the over-center position as shown in FIG. 4, on the far side of the center line 264, to the opposite near side of the center line 264, such that the compression forces are released from the bolt link 212 and bracket link 220. The handle 94 may be pivoted in a counter-clockwise direction about the pin 58 until the bracket link 220 engages the stop pin 250 and the lugs 66 of the bolt 56 engage the stop pin 116. As the handle 94 is pivoted toward the unlatched position, the handle 94 and linkage assembly 210 pivot the bolt 56 from the latched position to the unlatched position where the bolt 56 is pivoted out of engagement with and away from the second member 24.

When the latch mechanism 20 is in the unlatched position as shown in FIG. 8, the biasing member 188 resiliently biases the locking member 174 toward its latched position wherein the arms 184 are in engagement with the stop member 152 of the trigger 120. The stop pin 250 prevents the bracket link 220 and handle link 236 from pivoting to a position wherein the central axis of the pin 226 is located beyond a center line 266 that extends through the central axes of the pins 230 and 242.

When it is desired to move the latch mechanism 20 from the unlatched position as shown in FIG. 8 to the latched position as shown in FIG. 4, the tip of the tool 167 is placed in the recess 166 of the trigger 120. Using the mechanical advantage provided by the tool, the trigger 120 is pivoted in a clockwise direction about the central axis of the pin 168 as viewed in FIG. 8 such that the trigger 120 pivots with respect to the handle 94. The trigger 120 is pivoted in a clockwise direction until the tab 136 engages the top wall 102 of the handle 94. Upon further application of force to the trigger 120 in the clockwise direction, the trigger 120 and handle 94 conjointly pivot with respect to the bracket 40 about the central axis of the pin 58. As the handle 94 pivots toward the latched position, the handle 94 causes the handle link 236 to force the pin 226 downwardly and to spread the pins 68 and 230 apart thereby pivoting the bolt 56 clockwise about the central axis of the pin 58 with respect to the bracket 40 until the central axis of the pin 226 passes beyond the center line 264, whereupon the linkage assembly 210 snaps into the over-center latched position as shown in FIG. 4. At the same time as the handle 94 and trigger 120 are pivoting toward the latched position, the outer surface 182 of the hook 176 engages the pin 198 and bushing 200 whereby the pin 198 and bushing 200 pivot the locking member 174 counter-clockwise with respect to the trigger 120 about the central axis of the pin 168. As the tip 178 of the hook 176 passes beyond the pin 198 and bushing 200, the biasing member 188 pivots the locking member 174 in a clockwise direction about the central axis of the pin 168 to the latched position wherein the pin 198 and bushing 200 are located within the receptacle 180 of the hook 176. The locking member 174 is thereby coupled to the pin 198 and bracket 40 and releasably locks the handle 94 and bolt 56 in the latched position.

When the linkage assembly 210 is moved into the over-center locked position, an audible click is heard indicating that the latch mechanism 20 is in the latched position. A visual inspection to insure that the top wall 102 of the handle 94 and the top wall 130 of the trigger 120 are flush with one another and with the first surface 26 of the first member 22 provides further verification that the latch mechanism 20 is locked in the latched position. The latch mechanism 20 provides a preload latching force in the range of one-hundred pounds of force in the latched position, while the latch mechanism 20 can be manually moved to the latched position and to the unlatched position by a user with a force, such as twenty pounds, that is a fraction of the preload force that is generated by the latch mechanism 20 due to the mechanical advantage provided by the tool 167 as well as the latch mechanism 20 itself.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A latch mechanism for releasably latching or holding a first member with respect to a second member, the latch mechanism comprising:
    a bracket adapted to be attached to the first member;
    a bolt pivotally coupled to the bracket by a first pivot, the bolt being pivotal with respect to the bracket between a first position wherein the bolt is adapted to engage the second member and a second position wherein the bolt is adapted to be disengaged from the second member;
    a handle pivotally coupled to the bracket by the first pivot, the handle being pivotal with respect to the bracket between a third position and a fourth position, the handle operatively pivoting the bolt from the first position toward the second position as the handle pivots from the third position toward the fourth position, the handle operatively pivoting the bolt from the second position toward the first position as the handle pivots from the fourth position toward the third position;

a trigger pivotally coupled to the handle, the trigger including a coupler adapted to couple a tool to the trigger, the trigger being pivotal with respect to the handle between a fifth position and a sixth position;

a locking member coupled to the trigger, the locking member adapted to releasably couple the trigger to the bracket when the trigger is in the fifth position whereby the locking member prevents pivotal movement of the handle from the third position toward the fourth position;

whereby the trigger is selectively pivotal by the tool from the fifth position toward the sixth position to thereby uncouple the locking member from the bracket and such that the handle is thereby selectively pivotal by the tool from the third position toward the fourth position; and an over-center linkage assembly coupling the handle to the bracket and to the bolt wherein the linkage assembly includes a first link having a first end pivotally coupled to the bolt and a second end, a second link having a first end pivotally coupled to the second end of the first link and a second end pivotally coupled to the bracket, and a third link having a first end pivotally coupled to the second end of the first link and the first end of the second link and a second end pivotally coupled to the handle, the linkage assembly being moveable between a latched position wherein the first link and second link are adapted to bias the bolt into engagement with the second member with a preload force and an unlatched position, the linkage assembly being movable to the unlatched position by movement of the handle from the third position toward the fourth position.

2. The latch mechanism of claim 1 wherein the coupler of the trigger comprises a recess formed in the trigger.

3. The latch mechanism of claim 2 wherein the recess includes an opening in a top surface of the trigger.

4. The latch mechanism of claim 2 wherein the recess is generally wedge shaped.

5. The latch mechanism of claim 1 wherein the locking member comprises a hook.

6. The latch mechanism of claim 1 wherein the locking member is pivotally coupled to the trigger such that the locking member is adapted to pivot between a seventh position wherein the locking member is adapted to couple the trigger to the bracket, and an eighth position wherein the locking member is disengaged from the bracket.

7. A latch mechanism for releasably latching or holding a first member with respect to a second member, the latch mechanism comprising:

a bracket adapted to be attached to the first member;

a bolt pivotally coupled to the bracket, the bolt being pivotal with respect to the bracket between a first position wherein the bolt is adapted to engage the second member and a second position wherein the bolt is adapted to be disengaged from the second member;

a handle pivotally coupled to the bracket and operatively associated with the bolt, the handle being pivotal with respect to the bracket between a third position and a fourth position, the handle operatively pivoting the bolt from the first position toward the second position as the handle pivots from the third position toward the fourth position, the handle operatively pivoting the bolt from the second position toward the first position as the handle pivots from the fourth position toward the third position;

a trigger pivotally coupled to the handle, the trigger including a coupler adapted to couple a tool to the trigger, the trigger being pivotal with respect to the handle between a fifth position and a sixth position; and a locking member coupled to the trigger, the locking member adapted to releasably couple the trigger to the bracket when the trigger is in the fifth position whereby the locking member prevents pivotal movement of the handle from the third position toward the fourth position whereby the trigger is selectively pivotal by the tool from the fifth position toward the sixth position to thereby uncouple the locking member from the bracket and such that the handle is thereby selectively pivotal by the tool from the third position toward the fourth position;

wherein the locking member is pivotally coupled to the trigger such that the locking member is adapted to pivot between a seventh position wherein the locking member is adapted to couple the trigger to the bracket, and an eighth position wherein the locking member is disengaged from the bracket; and wherein the locking member includes a finger adapted to engage the trigger when the locking member is in the seventh position, the finger adapted to prevent pivotal movement of the locking member with respect to the trigger beyond the seventh position in a direction away from the eighth position.

8. The latch mechanism of claim 7 wherein the trigger includes a stop member adapted to engage the finger of the locking member when the locking member is in the seventh position.

9. The latch mechanism of claim 6 including a biasing member adapted to resiliently bias the locking member toward the seventh position.

10. The latch mechanism of claim 1 including a trigger biasing member adapted to resiliently bias the trigger toward the fifth position.

11. The latch mechanism of claim 1 including a handle biasing member adapted to resiliently bias the handle toward the fourth position.

12. The latch mechanism of claim 1 wherein the trigger includes a tab adapted to engage the handle when the trigger is in the fifth position thereby preventing pivotal movement of the trigger beyond the fifth position in a direction away from the sixth position.

13. The latch mechanism of claim 1 wherein the bolt includes an arm and an engagement member coupled to the arm.

14. The latch mechanism of claim 13 wherein the engagement member is selectively positionable with respect to the arm.

15. The latch mechanism of claim 1 wherein the linkage assembly releasably locks the bolt in the first position when the linkage assembly is in the latched position.

16. A latch mechanism for releasably latching or holding a first member with respect to a second member, the latch mechanism comprising:

a bracket adapted to be attached to the first member;

a bolt pivotally coupled to the bracket by a first pivot, the bolt being pivotal with respect to the bracket between a first position wherein the bolt is adapted to engage the second member and a second position wherein the bolt is adapted to be disengaged from the second member;

a handle pivotally coupled to the bracket by the first pivot and operatively associated with the bolt, the handle being pivotal with respect to the bracket between a third position and a fourth position, the handle operatively pivoting the bolt from the first position toward the second position as the handle pivots from the third position toward the fourth position, the handle operatively pivoting the bolt from the second position toward the first position as the handle pivots from the fourth position toward the third position;

a trigger pivotally coupled to the handle, the trigger being pivotal with respect to the handle between a fifth position and a sixth position; and a locking member pivotally coupled to the trigger, the locking member adapted to releasably couple the handle to the bracket when the trigger is in the fifth position such that the handle is releasably locked in the third position, whereby when the trigger is pivoted toward the sixth position the locking member is uncoupled from the bracket thereby allowing selective pivotal movement of the handle from the third position toward the fourth position; and a linkage assembly, the linkage assembly including a first link having a first end pivotally coupled to the bolt and a second end, a second link having a first end pivotally coupled to the second end of the first link and a second end pivotally coupled to the bracket, and a third link having a first end pivotally coupled to the second end of the first link and the first end of the second link and a second end pivotally coupled to the handle, the linkage assembly being moveable between a latched position wherein the first link and second link are adapted to bias the bolt into engagement with the second member with a preload force and an unlatched position, the linkage assembly being movable to the unlatched position by movement of the handle from the third position toward the fourth position.

17. The latch mechanism of claim 16 wherein the bracket includes a locking pin, the locking pin adapted to pivot the locking member with respect to the trigger from the fifth position toward the sixth position as the handle pivots toward the third position.

18. A method for latching comprising:

providing a latch mechanism including a bracket adapted to be attached to a first member, a bolt pivotably coupled to the bracket at a first pivot and adapted to releasably engage a second member, a handle pivotally coupled at the first pivot and operatively coupled to the bracket, a trigger operatively coupled to the handle, a locking member operatively coupled to the trigger and wherein the latch mechanism includes a first link operatively coupled to the bolt, a second link operatively coupled to the bracket and to the first link, and a third link operatively coupled to the handle and to the first and second links;

applying a force to the trigger whereby the trigger, handle and bolt pivot with respect to the bracket from an unlatched position to a latched position; and pivoting the locking member with respect to the trigger to a locked position wherein the locking member releasably couples the trigger to the bracket and thereby releasably locks the trigger, handle and bolt in the latched position;

applying a force to the third link so that the first and second links move into an over-center position with respect to the bolt and the bracket as the handle and bolt are pivoted from the unlatched position to the latched position such that the first and second links releasably lock the bolt in the latched position.

19. The method of claim 18 including the step of coupling a tool to the trigger, whereby the force applied to the trigger is provided by the tool.

20. A method for unlatching comprising:

providing a latch mechanism including a bracket adapted to be attached to a first member, a bolt pivotably coupled to the bracket at a first pivot and adapted to releasably engage a second member, a handle pivotally coupled at the first pivot and operatively coupled to the bracket, a trigger operatively coupled to the handle, and a locking member operatively coupled to the trigger and adapted to be selectively coupled to the bracket to thereby prevent pivotal movement of the handle from a latched position to an unlatched position and wherein the latch mechanism includes a linkage assembly having a first link operatively coupled to the bolt, a second link operatively coupled to the bracket and to the first link, and a third link operatively coupled to the handle and to the first and second links;

applying a force to the trigger whereby the trigger and locking member pivot with respect to the bracket to thereby uncouple the locking member from the bracket;

applying a further force to the trigger whereby the trigger, handle and bolt pivot with respect to the bracket toward the unlatched position and moving the first and second links to an over-center position with respect to the bolt and the bracket to releasably lock the bolt in the latched position when the handle is in the latched position, and moving the first and second links from the over-center position with the aid of the third link as the handle is pivoted from the latched position toward the unlatched position.

21. The method of claim 20 including coupling a tool to the trigger, whereby the force applied to the trigger is provided by the tool.

* * * * *